US008824456B2

(12) United States Patent
Itaba

(10) Patent No.: US 8,824,456 B2
(45) Date of Patent: Sep. 2, 2014

(54) SERVER DEVICE AND INFORMATION REGISTRATION METHOD

(75) Inventor: Masahiro Itaba, Tokyo (JP)

(73) Assignee: Rakuten, Inc., Tokyo (JP)

(*) Notice: Subject to any disclaimer, the term of this patent is extended or adjusted under 35 U.S.C. 154(b) by 964 days.

(21) Appl. No.: 12/671,435

(22) PCT Filed: Jul. 29, 2008

(86) PCT No.: PCT/JP2008/063556
§ 371 (c)(1),
(2), (4) Date: Apr. 27, 2010

(87) PCT Pub. No.: WO2009/020007
PCT Pub. Date: Feb. 12, 2009

(65) Prior Publication Data
US 2010/0202445 A1 Aug. 12, 2010

(30) Foreign Application Priority Data

Aug. 6, 2007 (JP) .............................. P.2007-203991

(51) Int. Cl.
H04L 12/66 (2006.01)
H04W 4/00 (2009.01)
G06F 15/16 (2006.01)

(52) U.S. Cl.
USPC ........... 370/352; 455/466; 709/203; 709/207; 709/227

(58) Field of Classification Search
USPC ............ 370/352; 455/466; 709/203, 207, 227
See application file for complete search history.

(56) References Cited

U.S. PATENT DOCUMENTS

2006/0233160 A1   10/2006   Kawanishi et al.
2008/0139228 A1*   6/2008   Raffel et al. .................. 455/466
2008/0140536 A1*   6/2008   Ruiz Tejedor et al. .......... 705/26

FOREIGN PATENT DOCUMENTS

DE     103 09 578 A1    9/2004
JP     2004-227228 A    8/2004

(Continued)

OTHER PUBLICATIONS

European Search Report dated Sep. 13, 2011.

(Continued)

Primary Examiner — Asad Nawaz
Assistant Examiner — Stephanie Chang
(74) Attorney, Agent, or Firm — Sughrue Mion, PLLC

(57) ABSTRACT

The present invention provides an information registration system, a server device, a server processing program, and an information registration method which are capable of efficiently registering a telephone number without hesitation of the user and recognizing an identical person using the telephone number thus registered.

According to the present invention, an information registration system is provided with a server device and a terminal device which has a browser function and is connectable to the server device through a communication means. The terminal device is provided with a display means for displaying a specified page and a determination request sending means for sending to the server device a telephone number registration determination request including a telephone number designated by a user through thus displayed page.

The server device is provided with a registration list memory means for memorizing a registration list on which the telephone number is registered; a registration determination request reception means for receiving the registration determination request; a registration determination means for determining whether or not the telephone number included in the registration determination request is registered on the registration list; an approval request information sending means for sending approval request information for encouraging approval to the telephone terminal device, when a call is made to the telephone terminal device corresponding to the telephone number through a communication means and the call is answered, in a case where the telephone number is not registered on the registration list; and a registration means for registering the telephone number included in the registration determination request on the registration list, in a case where approval information indicative of the approval is received from the telephone terminal device in response to the approval request information.

9 Claims, 5 Drawing Sheets

(56) References Cited

FOREIGN PATENT DOCUMENTS

| | | |
|---|---|---|
| JP | 2004-246821 A | 9/2004 |
| JP | 2006-33780 A | 2/2006 |
| JP | 2007-96570 A | 4/2007 |
| WO | 2005/088952 A1 | 9/2005 |
| WO | 2007/026320 A2 | 3/2007 |

OTHER PUBLICATIONS

European Patent Office Communication dated May 16, 2012 for European Application No. 08791791.0.

Japanese Office Action dated Nov. 27, 2012 issued in Japanese Application No. 2007-203991.

* cited by examiner

SERVER DEVICE AND INFORMATION REGISTRATION METHOD

TECHNICAL FIELD

The present invention relates to a technical field of an information registration system for registering a telephone number, including a server device and a terminal device which has a browser function and is connectable to the server device through a communication means.

BACKGROUND ART

With respect to authentication for access to a specified server on the internet, the Patent Document 1 discloses a callback authentication system which uses a telephone number instead of a user ID. In such the callback authentication system, an authentication device recognizes that a telephone number received from a user's terminal device together with an authentication request is previously registered and has access authority. Without any problem, the authentication device calls back to the telephone number and authenticates an identical person.

[Patent Document 1] Japanese Published Unexamined Patent Application No. 2006-33780

DISCLOSURE OF THE INVENTION

Problem to be Solved by the Invention

However, the above-described callback authentication system requires a procedure of registering the telephone number of the user's terminal device in advance. Therefore, it is imagined that the user hesitates such the previous registration because it is very troublesome.

The present invention is provided in consideration of the above problems. An object of the present invention is to provide, a server device and an information registration method, in which a telephone number can be efficiently registered without making the user hesitate and an identical person can be recognized by using the telephone number thus registered.

Means for Solving Problem

A server device according to claim 2 is characterized in that the system is provided with a registration list memory means for memorizing a registration list on which a telephone number is registered; on the registration list; and a registration determination request reception means for receiving, from the terminal device through a communication means, a telephone number registration determination request including the telephone number designated by a user through a specified page displayed on a terminal device; a registration determination means for determining whether or not the telephone number thus included in the registration determination request is registered on the registration list; an approval request information sending means for sending approval request information for encouraging approval to the telephone terminal device, when a call is made to the telephone terminal device corresponding to the telephone number through the communication means and the call is answered, in a case where the telephone number is not registered on the registration list; and a registration means for registering the telephone number thus included in the registration determination request on the registration list in a state of displaying the Web page, in a case where approval information indicative of approval is received from the telephone terminal device in response to the approval request information.

According to this invention, the server device determines whether or not the telephone number thus included in the registration determination request received from the terminal device is registered on the registration list. In a case where it is not registered, when a call is made to the telephone terminal device corresponding to the telephone number in a state of displaying the Web page and the call is answered, approval request information for encouraging approval is sent to the telephone terminal device. In a case where approval information indicative of approval is received from the telephone terminal device in response to the approval request information, the telephone number included in the registration determination request is registered on the registration list in a state of displaying the Web page. Therefore, according to such the configuration, a troublesome procedure of previously registering the telephone number is not required, so that the telephone number can be efficiently registered without causing the user to hesitate and an identical person can be recognized using the telephone number thus registered.

The server device according to claim 3 is characterized in that, in the server device according to claim 2, the server device is further provided with a communication connection control means for forming a communication path between other telephone terminal device and the telephone terminal device corresponding to the telephone number thus registered on the registration list and for connecting both of the telephone terminal devices, when a call is made through the communication means to the other telephone terminal device corresponding to the telephone number in association with the Web page and the call is answered, in a case where the telephone number thus included in the registration determination request is registered on the registration list.

According to this invention, it is possible to prevent such a malicious act that a telephone number of the other person is inputted on the page and a telephone is called.

The server device according to claim 4 is characterized in that, in the server device according to claim 2, the server device is further provided with a communication connection control means for forming a communication path between the other telephone terminal device and the telephone terminal device corresponding to the telephone number thus registered on the registration list and for connecting both of the telephone terminal devices, when a call is made through the communication means to the other telephone terminal device corresponding to the telephone number in association with the Web page and the call is answered, in a case where the telephone number is registered on the registration list.

The server device according to claim 6 is characterized in that, in the server device according to any one of claims 2 to 4, a pair of telephone number and user identification information is registered on the registration list, wherein user identification information of the user of the terminal device is included together with the telephone number in the registration determination request, the registration determination means determines whether or not the pair of telephone number and user identification information which is thus included in the registration determination request is registered on the registration list, the approval request information sending means sends approval request information for encouraging approval to the telephone terminal device, when a call is made to the telephone terminal device corresponding to the telephone number through a communication means in a state of displaying the Web page and the call is answered, in a case where the pair of telephone number and user identification information is not registered on the registration list, and the registration means registers on the registration list the pair of telephone number and user identification information which is included in the registration determination request in a state of displaying the Web page, in a case where the registration means receives approval information indicative of approval from the telephone terminal device in response to the approval request information.

The server device according to claim 7 is characterized in that, in the server device according to any one of claims 2, 3, 4 and 6, a pair of telephone number and store identification information is registered on the registration list, store identification information of the store corresponding to the page is included together with the telephone number in the registration determination request, the registration determination means determines whether or not the pair of telephone number and store identification information which is thus included in the registration determination request is registered on the registration list, the approval request information sending means sends approval request information for encouraging approval to the telephone terminal device, when a call is made to the telephone terminal device corresponding to the telephone number through a communication means in a state of displaying the Web page and the call is answered, in a case where the pair of telephone number and store identification information is not registered on the registration list, and the registration means registers on the registration list the pair of telephone number and store identification information which is included in the registration determination request in a state of displaying the Web page, in a case where the registration means receives approval information indicative of approval from the telephone terminal device in response to the approval request information.

The invention according to claim 9 is characterized in that, an information registration method in a server device is provided with: a step of memorizing a registration list on which a telephone number is registered; on the registration list; and a step of receiving through a communication means from a terminal device a telephone number registration determination request which includes a telephone number designated by a user through a specified Web page displayed in the terminal device; a step of determining whether or not the telephone number included in the registration determination request is registered on the registration list; a step of sending approval request information for encouraging approval to a telephone terminal device, when a call is made to the telephone terminal device corresponding to the telephone number through a communication means in a state of displaying the Web page and the call is answered, in a case where the telephone number is not registered on the registration list; and a step of registering the telephone number included in the registration determination request on the registration list in a state of displaying the Web page, in a case where a royal information indicative of a royal is received from the telephone terminal device in response to the approval request information.

Effect of the Invention

According to this invention, the server device determines whether or not the telephone number included in the registration determination request which is received from the terminal device is registered on the registration list. In a case where the telephone number is not registered, a call is made to the telephone terminal device corresponding to the telephone number through the communication means in a state of displaying the Web page. When the call is answered, the approval request information for encouraging approval is sent to the telephone terminal device and the approval information indicative of the approval is received from the telephone terminal device in response to the approval request information, the telephone number included in the registration determination request is registered on the registration list in a state of displaying the Web page. In such the configuration, since the troublesome procedure of registering the telephone number in advance is not necessary, it is possible that the telephone number is efficiently registered without user's hesitation and an identical person is recognized using thus registered telephone number.

DESCRIPTION OF REFERENCE NUMERALS

1: User terminal;
2: Web server;
3: Registration server;
4: User telephone equipment;
5: Store telephone equipment;
11, 31: Operation unit;
12, 32: Display unit;
13, 33: Communication unit;
14, 34: Drive unit;
15, 35: Memory unit;
16, 36: Input/output interface unit;
17, 37: System control unit;
18, 38: System bus; and
S: Telephone connection system

BEST MODE FOR CARRYING OUT THE INVENTION

Hereinafter, embodiments of the present invention are explained in detail with reference to figures. The embodiments explained below are examples in which the present invention is applied to a telephone connection system.

[1. Configuration and Function of Telephone Connection System]

Figure 1:
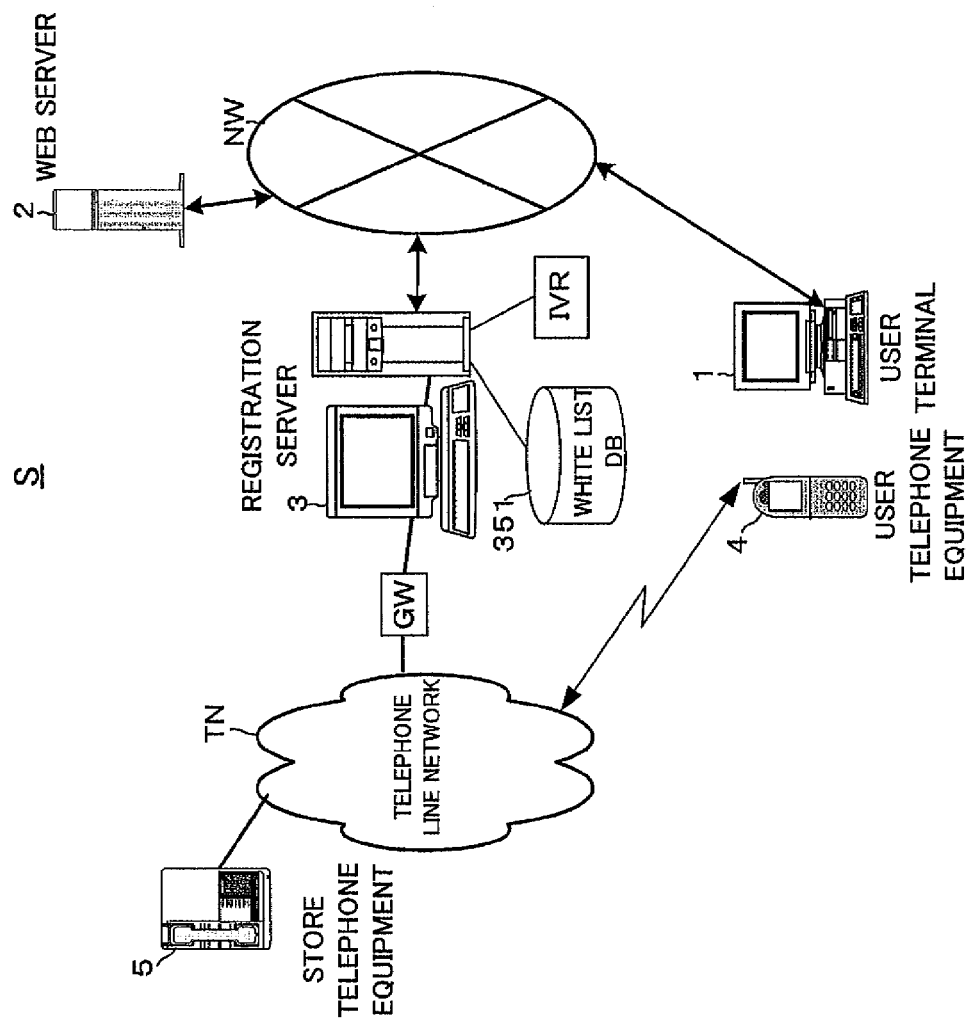
FIG. 1 is a diagram showing a schematic configuration example of a telephone connection system S according to the present embodiment.

First, a configuration and a function of a telephone connection system S according to the present embodiment are explained using FIG. 1 and the like.

FIG. 1 is a diagram showing a schematic configuration example of a telephone connection system S according to the present embodiment.

As shown in FIG. 1, the telephone connection system S is provided with a user terminal 1 (an example of terminal device), a web server 2, a registration server 3 (an example of server device), a user telephone equipment 4 (an example of telephone terminal device), a store telephone equipment 5 (an example of the other telephone terminal device), and the like.

The user terminal 1 has a browser function and is connectable to a network NW (a relay device and the like such as a communication line and a router) through a server of, for example, an internet service provider. For connecting to the network NW, it is assigned by an inherent IP address (e.g. global IP address).

The web server 2 and the registration server 3 are connected to the network NW such as an internet and an intranet and are assigned by an inherent IP (Internet Protocol) address (global IP address).

Further, the web server 2 includes sites such as a shopping site and provides a web page in response to a request from the user terminal 1 which is connected trough the network NW.

Further, the registration server 3 is also connected to a telephone line network TN (a communication means including such as a public telephone line (PSTN) and a mobile telephone line (including a base station and the like)).

Further, the user telephone equipment 4 and the store telephone equipment 5 are respectively assigned by inherent telephone numbers and are connected to the telephone line network TN. The user telephone equipment 4 and the store telephone equipment 5 may be fixed telephone equipment or mobile telephone equipment.

Further, the user telephone equipment 4 is used by a user of the user terminal 1 and the store telephone equipment 5 is used by, for example, a clerk and a manager of the store.

[1-1. Configuration, Function, and the Like of User Terminal 1]

Figure 2:
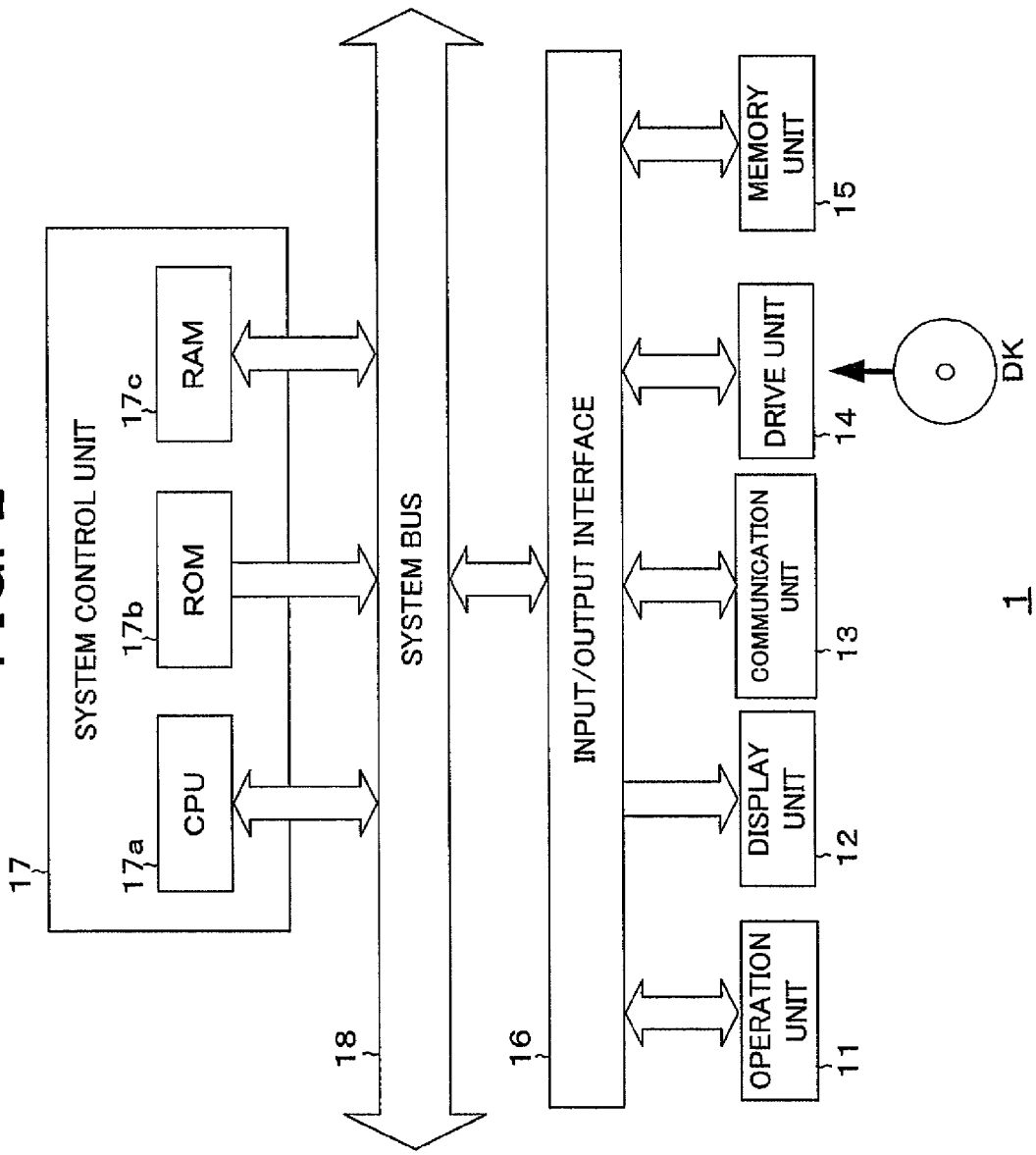
FIG. 2 is a block diagram showing a schematic configuration example of a user terminal 1.

Next, a configuration and a function of the user terminal 1 are explained in detail using FIG. 2 and others.

FIG. 2 is a block diagram showing a schematic configuration example of the user terminal 1.

As shown in FIG. 2, the user terminal 1 is provided with an operation unit 11, a display unit 12, a communication unit 13, a drive unit 14, a memory unit 15, an input/output interface unit 16, a system control unit 17, and the like. The system control unit 17 and the input/output interface unit 16 are connected to each other through a system bus 18. A general-purpose personal computer is applicable as a user terminal 1.

The operation unit 11 is composed of a keyboard, a mouse, and the like and accepts an operation instruction from the user and outputs instruction content as a instruction signal to the system control unit 17.

The display unit 12 is composed of, for example, CRT (Cathode Ray Tube) display, a liquid crystal display, and the like and displays information such as characters and images.

The communication unit 13 is connected to the network NW for controlling communication condition with the web server 2, the registration server 3, or the like.

A drive unit 14 reads out data and the like from a disk DK (recording medium) such as, for example, a flexible disk, CD (Compact Disc), DVD (Digital Versatile Disc) and records data and the like on the disk DK.

The memory unit 15 is composed of, for example, a hard disk drive and the like and memorizes an operating system (O/S), various types of programs, data, and the like.

The input/output interface unit 16 carries out an interface process between the system control unit 17 and the operation unit 11 to the memory unit 15.

Next, the system control unit 17 is provided with CPU (Central Processing Unit) 17a, ROM (Read Only Memory) 17b, RAM (Random Access Memory) 17c, and the like and integrally controls the user terminal 1 as a whole. The CPU 17a reads out and executes a various types of programs thus memorized in the ROM 17b and the memory unit 15, so that the system control unit 17 functions as a display means, a determination request sending means, and the like in the present invention.

Specifically, after starting a browser, the system control unit 17 causes the display unit 12 to display a web page provided (sent) by connecting to the web server 2 based on URL (Uniform Resource Locator) of a specific site (e.g. shopping site) which is designated by the user on the browser. The web page is composed of, for example, HTML (Hyper Text Markup Language) data, image data which is embedded therein, and the like.

Figure 3:
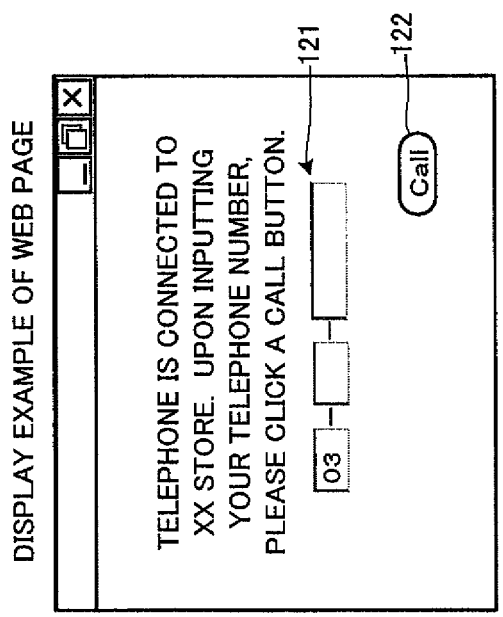
FIG. 3 is a diagram showing a display example of a provided web page.

FIG. 3 is a diagram showing a display example of the web page thus provided. The web page shown in FIG. 3 is a page for connecting telephone to a given store and includes a telephone number of store telephone equipment 5 of the store (information specifying the store). A telephone number input column 121 for designating a telephone number of the user telephone equipment 4 which is used by the user of the user terminal 1 and a "Call" button 122 are also provided on the page. URL for connecting to the registration server 3 is installed (embedded) in the "Call" button 122.

In such the display state, when the user operates the operation unit 11 for inputting (e.g. inputting by keyboard) the telephone number of the user telephone equipment 4 in the telephone number input column 121 and designates (e.g. clicks by mouse) the "Call" button 122, the user terminal 1 is connected to the registration server 3 based on URL of the registration server 3 which is installed in the "Call" button 122 and a telephone number registration determination request including the telephone number designated by the user through the page is sent to the registration server 3.

The telephone number registration determination request is a request based on, for example, HTTP (Hypertext Transfer Protocol), and the request includes address information of a sending source and destination, the telephone number of the user telephone equipment 4, the telephone number of the store telephone equipment 5 of the store corresponding to the page (or store ID as store identification information of the store), a content of processing request for the registration server 3 (here, telephone number registration determination request), and the like. Meanwhile, the telephone number of user telephone equipment 4 may be designated by the user from a display list of telephone numbers which are previously stored in the user terminal 1 (e.g. stored in cookie).

A telephone number registration determination process and the like are carried out in the registration server 3 by the telephone number registration determination request thus sent to the registration server 3, and telephone is connectable between the user telephone equipment 4 and the store telephone equipment 5.

[1-2. Configuration, Function, and the Like of Registration server 3]

Figure 4:
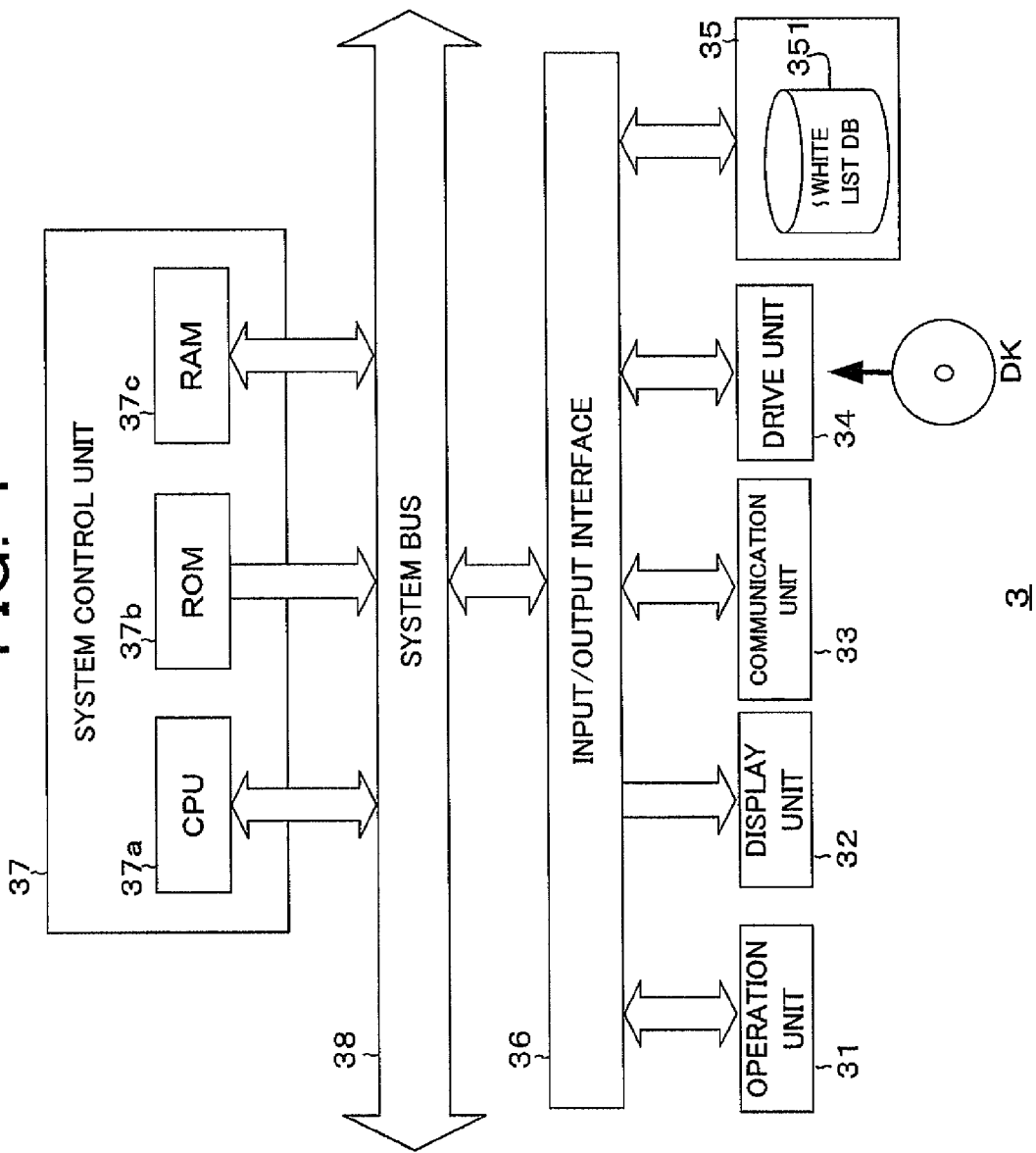
FIG. 4 is a block diagram showing a schematic configuration example of a registration server 3.

Next, a configuration and function of the registration server 3 are explained in detail using FIG. 4 and others.

FIG. 4 is a block diagram showing a schematic configuration example of the registration server 3.

As shown in FIG. 4, the registration server 3 is provided with an operation unit 31, a display unit 32, a communication unit 33, a drive unit 34, a memory unit 35 as an example of a registration list memory means, an input/output interface unit 36, a system control unit 37 and the like. The system control unit 37 and the input/output interface unit 36 are connected to each other through a system bus 38.

A basic configuration of the operation unit 31, the display unit 32, the communication unit 33, the drive unit 34, the memory unit 35, and the input/output interface unit 36 is similar to that of the operation unit 11, the display unit 12, the communication unit 13, the drive unit 14, the memory unit 15, and the input/output interface unit 16 of the user terminal 1 described above.

The memory unit 35 memorizes an operating system (O/S), various types of programs (including the server processing program of the present invention), data, and the like. The server processing program and the like of the present invention may be downloaded from, for example, other servers through a network NW or may be recorded in a disk DK such as CD-ROM and read through the drive unit 34.

Further, in the memory unit 35, a white list database 351 is built for memorizing a white list (an example of registration list) for registering telephone numbers.

Further, CPU 37a reads out and executes various types of programs which are memorized in ROM 37b and the memory unit 35. It causes the system control unit 37 to function as registration determination request reception means, approval request information sending means, registration means, communication connection control unit, and the like in the present invention.

Specifically, the system control unit 37 determines whether or not a telephone number included in the telephone number registration determination request is registered on the white list when the telephone number registration determination request is received from the user terminal 1 through a network NW. The system control unit 37 made a call to the user telephone equipment 4 corresponding to the telephone number through the telephone line network TN, in a case where the telephone number is not registered on the white list. When the call is answered (i.e. the user of the user telephone equipment 4 performs an incoming response operation), the system control unit 37 sends approval request information for encouraging an approval to the user telephone equipment 4.

The approval request information may be voice information previously set up, for example, and the recorded voice is automatically reproduced by a known IVR (Interactive Voice Response) function, and the voice information is emitted to the user telephone equipment 4 through the telephone line network TN. As a content of such the voice information, it is considered a voice message for encouraging approval, for example, "those who uses a XXX system, please press button [1] and those who do not use it, please press button [2]". Further the IVR function may be embedded in the registration server 3 or a device having the IVR function may be connected to the registration server 3.

In a case where the approval information indicative of approval is received from the user telephone equipment 4 in response to the approval request information (the user presses an operation button [1] indicative of approval in the user telephone equipment 4), the system control unit 37 registers the telephone number included in the telephone number registration determination request. In a case where this telephone number is registered on the white list, the system control unit 37 makes a call through the telephone line network TN to a store telephone equipment 5 corresponding to the telephone number which is included in the telephone number registration determination request and in response to the page (i.e. the page on which the telephone number is inputted in the telephone number input column 121 displayed in the user terminal 1). In a case where the call is answered, the system control unit 37 forms a communication path between the store telephone equipment 5 and the user telephone equipment 4 corresponding to the telephone number registered on the white list and connects both of the telephone equipment. Therefore, it is possible for the user to communicate with a partner (e.g. store clerk) of the store telephone equipment 5 through the user telephone equipment 4. For example, it is possible to offer to purchase goods on sale at a web site.

It may be configured so that in a case where the store ID of the store instead of the telephone number of the store telephone equipment 5 of the store corresponding to the page is included in the telephone number registration determination request, a table for defining correspondence relationship between the store ID and the telephone number is memorized in the registration server 3. When the telephone number registration determination request is received, the system control unit 37 may acquire from the table the telephone number which is associated with the store ID included in the telephone number registration determination request and makes a call to the store telephone equipment 5.

Further, once the telephone number is thus registered on the white list, the system control unit 37 makes a call to the store telephone equipment 5 corresponding to the telephone number in association with the page through the telephone line network TN without sending approval request information for encouraging approval to the user telephone equipment 4. When the call is answered, the system control unit 37 forms a communication path between the store telephone equipment 5 and the user telephone equipment 4 corresponding to the telephone number thus registered on the white list and connects both of the telephone equipment to each other.

[2. Action of Telephone Connection System S]

Figure 5:
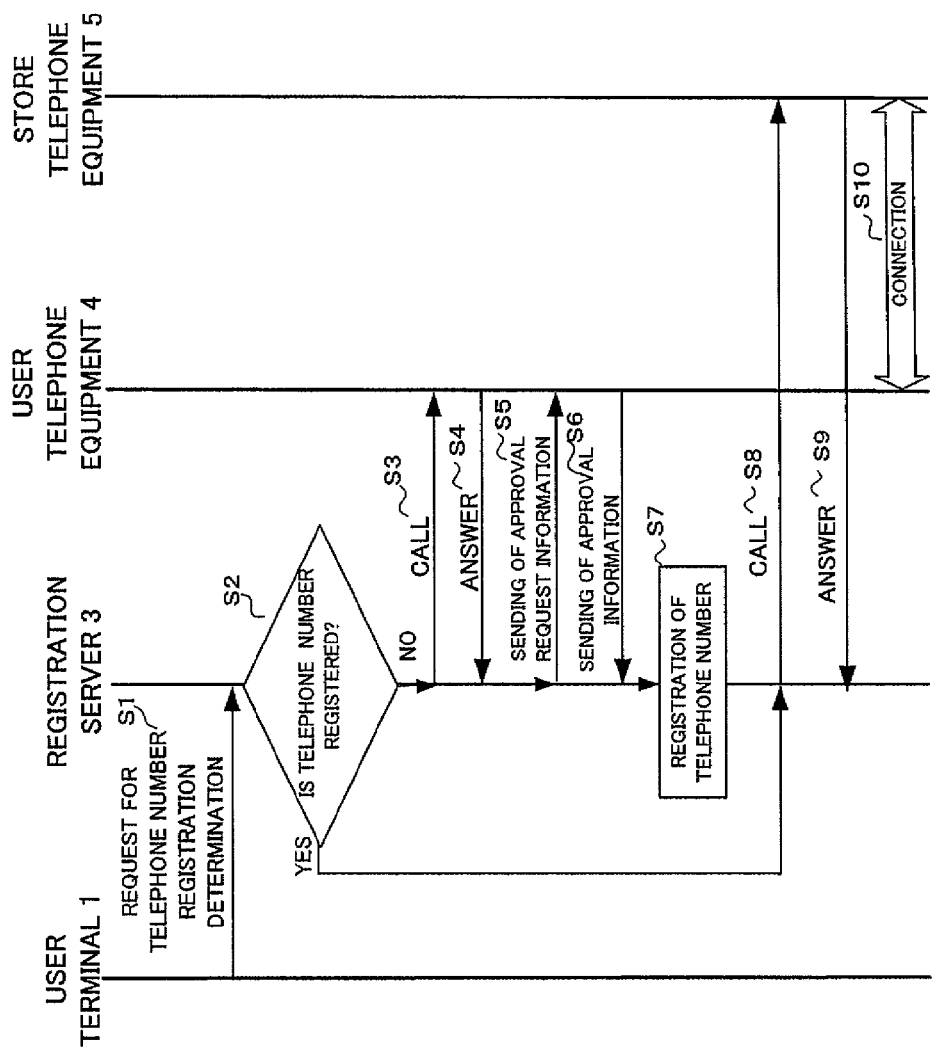
FIG. 5 is a sequence diagram showing information exchange and the like in the telephone connection system S.

Next, an action of a telephone connection system S according to the present embodiment is explained using FIG. 5.

FIG. 5 is a sequence diagram showing exchange of information and the like in the telephone connection system S.

First, in a state that a page as shown in FIG. 3 is displayed in the user terminal 1, when the user designates the telephone number of the user telephone equipment 4 in the telephone number input column 121 and designates the "Call" button 122, the above-mentioned telephone number registration determination request (e.g. a request based on HTTP) is sent from the user terminal 1 to the registration server 3 (Step S1).

Next, when the telephone number registration determination request is received by the registration server 3, it is determined whether or not the telephone number included in the telephone number registration determination request is registered on the white list (Step S2). In a case where the telephone number is not registered on the white list (Step S2: NO), a call is made from the registration server 3 to the user telephone equipment 4 corresponding to the telephone number (sending of a call signal) (Step S3). When the call is answered (reception of a response signal) (Step S4), approval request information, for example, a voice message for encouraging approval is emitted from the registration server 3 to the user telephone equipment 4 (Step S5).

When the user of the user telephone equipment 4, for example, pushes an operation button indicative of approval in response to the voice message, approval information indicative of the approval is sent from the user telephone equipment 4 to the registration server 3 (Step S6).

Next, when the approval information is received in the registration server 3, the telephone number of the user telephone equipment 4 included in the telephone number registration determination request is registered on the white list (Step S7). Subsequently, a call is made from the registration server 3 to store telephone equipment 5 corresponding to the telephone number which is included in the telephone number registration determination request and is in association with the page (Step S8). When the call is answered (Step S9), a communication path is formed between the store telephone equipment 5 and the user telephone equipment 4 corresponding to the telephone number registered on the white list for connecting both of the telephone equipment to each other (Step S10).

Next, the accounting process is carried out by the registration server 3 to the store having the store telephone equipment 5 (e.g. a specific amount is added in association with a store ID of the store).

In a case where the telephone number is registered on the white list in the above step S2 (Step S2: YES), processes of Steps S3 to S7 are not carried out, it proceeds to Step S8 and processes of Steps S8 to S10 are carries out.

As described above, according to the above-mentioned embodiment, the registration server 3 determines whether or not the telephone number included in the telephone number registration determination request which is received from the user terminal 1 is registered on the white list. In a case where it is not registered on the white list, a call is made to the user telephone equipment 4 corresponding to the telephone number and when the call is answered, approval request information for encouraging approval is sent to the user telephone equipment 4. In a case where the approval information is received from the user telephone equipment 4 in response to the approval request information, the telephone number included in the telephone number registration determination request is registered on the white list. Therefore, a troublesome procedure of previously registering a telephone number is not necessary, and it is possible to efficiently register a telephone number without user's hesitation and recognize an identical person using thus registered telephone number.

Only after the telephone number is thus registered, a call is made to the store telephone equipment 5 corresponding to the telephone number in association with the page. When the call is answered, a communication path is formed between the store telephone equipment 5 and the user telephone equipment 4 corresponding to the telephone number registered on the white list for connecting both of the telephone equipment to each other. Therefore, it is possible to prevent such a malicious act that a telephone number of the other telephone equipment is inputted on the page and the telephone call is made to the store.

According to the present embodiment, the registration server 3 determines whether or not the telephone number included in the telephone number registration determination request is registered on the white list. However, as another example, a pair of telephone number and user ID as user identification information may be included in the telephone number registration determination request and it may be determined whether or not the pair of telephone number and user ID is registered on the white list. In such a configuration, in a case where the pair of telephone number and user ID is not registered on the white list, processes of the above Steps S3 to S10 shown in FIG. 5 are carried out (the pair of telephone number and user ID is registered on the white list in Step S7). In a case where the pair of telephone number and user ID is registered on the white list, processes of Steps S8 to S10 are carried out without carrying out processes of the above Steps S3 to S7. Further, in this configuration, a user ID inputted (e.g. stored in a cookie) in a login process which is carried out before or while a page as shown in FIG. 3 is displayed is included in the telephone number registration determination request.

In such the configuration, for example, even in a case where the user changes without changing the telephone number of the user telephone equipment 4, it is possible to recognize an identical person without fail in addition to the above-mentioned advantages. An e-mail address of the user may be used instead of the user ID. In this case, the e-mail address is inputted, for example, in an e-mail address input column previously provided on the page.

Further, as another example, a pair of telephone number and store ID may be included in the telephone number registration determination request and it may be determined whether or not the pair of telephone number and store ID (or a set of telephone number, user ID, and store ID) is registered on the white list. In such a configuration, in a case where the pair of telephone number and store ID (or the set of telephone number, user ID, and store ID) is not registered on the white list, processes of the above Steps S3 to S10 shown in FIG. 5 are carried out (the pair of telephone number and store ID is registered on the white list in Step S7). In a case where the pair of telephone number and store ID (or the set of telephone number, user ID, and store ID) is registered on the white list, processes of Steps S8 to S10 are not carried out without carrying out processes of the above Steps S3 to S7. Further, in this configuration, the store ID added on the page (e.g. included in URL of the page, or in HTML data forming the page) is inputted in the telephone number registration determination request.

Further, although the approval request information is the voice information in the above-mentioned embodiment, it may be character information. In this case, a massage for encouraging approval is displayed on the display screen of the user telephone equipment 4. When, in response to this, the user presses, for example, an operation button indicative of approval in the user terminal 1 approval information indicative of the approval is sent from the user telephone equipment 4 to the registration server 3.

According to an example shown in the above-mentioned embodiment, in the user terminal 1, when the user inputs the telephone number of the user telephone equipment 4 in the telephone number input column 121 of the web page and designates the "Call" button 122, the user terminal 1 is connected to the registration server 3 and the telephone number registration determination request including the telephone number is sent to the registration server 3. As another example, an administration server may be provided, for example, between a user terminal 1 and a registration server 3, and when the user inputs a telephone number of user telephone equipment 4 in the telephone number input column 121 and designates the "Call" button 122, the user terminal 1 is connected to the administration server, and a telephone number registration determination request including the telephone number is sent to the administration server. In this case, the administration server transfers the telephone number registration determination request thus received to the registration server 3, the registration server 3 carries out the processes such as the above-mentioned telephone number registration determination process when the registration server 3 receives the telephone number registration determination request from the administration server. Here, the administration server and the registration server 3 configure the "server device" of the present invention.

What is claimed

1. A server device comprising:
a registration list memory means for memorizing a registration list on which a telephone number is registered;
a registration determination request reception means for receiving, from a terminal device through a communication means, a telephone number registration determination request including the telephone number designated by a user through a specified Web page displayed on a terminal device;
a registration determination means for determining whether or not the telephone number thus included in the registration determination request is registered on the registration list,
wherein when the telephone number is not registered on the registration list, using an approval request information sending means for sending approval request information for encouraging approval to the telephone terminal device, when a call is made to the telephone terminal device corresponding to the telephone number through the communication means in a state of displaying the Web page and the call is answered, and a registration means for registering the telephone number thus included in the registration determination request on the registration list in a state of displaying the Web page, in a case where approval information indicative of the approval is received from the telephone terminal device in response to the approval request information, wherein the telephone terminal device transmits the approval information to the server device when an operation button indicative of approval is pressed by the user on the telephone terminal device, wherein a pair of telephone number and store identification information is registered on the list, store identification information of the store corresponding to the Web page is included together with the telephone number in the registration determination request, the registration determination means determines whether or not the pair of telephone number and store identification information which is included in the registration determination request is registered on the registration list, the approval request information sending means sends approval request information for encouraging approval to the telephone terminal device, when a call is made to the telephone terminal device corresponding to the telephone number through a communication means in a state of displaying the Web page and the call is answered, in a case where the pair of telephone number and store identification information is not registered on the registration list, and the registration means registers on the registration list the pair of telephone number and store identification information which is included in the registration determination request in a state of displaying the Web page, in a case where the registration means receives approval information indicative of approval from the telephone terminal device in response to the approval request information.

2. The server device according to claim 1, wherein the server device further comprises a communication connection control means for forming a communication path between other telephone terminal device and the telephone terminal device corresponding to the telephone number thus registered on the registration list and for connecting both of the telephone terminal devices, when a call is made through the communication means to the other telephone terminal device corresponding to the telephone number in association with the Web page and the call is answered, in a case where the telephone number thus included in the registration determination request is registered on the registration list.

3. The server device according to claim 1, wherein the server device further comprises a communication connection control means for forming a communication path between the other telephone terminal device and the telephone terminal device corresponding to the telephone number thus registered on the registration list and for connecting both of the telephone terminal devices, when a call is made through the communication means to the other telephone terminal device corresponding to the telephone number in association with the Web page and the call is answered, in a case where the telephone number is registered on the registration list.

4. The server device according to claim 1, wherein a pair of telephone number and user identification information is registered on the registration list, user identification information of the user of the terminal device is included together with the telephone number in the registration determination request, the registration determination means determines whether or not the pair of telephone number and user identification information which is included in the registration determination request is registered on the registration list, the approval request information sending means sends approval request information for encouraging approval to the telephone terminal device, when a call is made to the telephone terminal device corresponding to the telephone number in a state of displaying the Web page and the call is answered, in a case where the pair of telephone number and user identification information is not registered on the registration list, and the registration means registers on the registration list the pair of telephone number and user identification information which is included in the registration determination request in a state of displaying the Web page, in a case where the registration means receives approval information indicative of approval from the telephone terminal device in response to the approval request information.

5. An information registration method in a server device comprising:

memorizing a registration list on which a telephone number is registered;

receiving through a communication means from a terminal device a telephone number registration determination request which includes a telephone number designated by a user through a specified Web page displayed in the terminal device;

determining whether or not the telephone number included in the registration determination request is registered on the registration list, wherein when the telephone number is not registered on the registration list, sending approval request information for encouraging approval to a telephone terminal device, when a call is made to the telephone terminal device corresponding to the telephone number through a communication means in a state of displaying the Web page and the call is answered, and registering the telephone number included in the registration determination request on the registration list in a state of displaying the Web page, in a case where approval information indicative of the approval is received from the telephone terminal device in response to the approval request information, wherein the telephone terminal device transmits the approval information to the server device when an operation button indicative of approval is pressed by the user on the telephone terminal device, wherein a pair of telephone number and store identification information is registered on the registration list, store identification information of the store corresponding to the Webpage is included together with the telephone number in the registration determination request, the determining comprises determining whether or not the pair of telephone number and store identification information which is included in the registration determination request is registered on the registration list, when the pair of telephone number and store identification information is not registered on the registration list, sending approval request information for encouraging approval to the telephone terminal device, when a call is made to the telephone terminal device corresponding to the telephone number through a communication means in a state of displaying the Web page and the call is answered, and the registering comprises registering on the registration he pair of telephone number and store identification information which is included in the registration determination request in a state of displaying the Web page, in a case where approval information indicative of approval is received from the telephone terminal device in response to the approval request information.

6. A server system comprising:

at least one memory operable to store a registration list of at least one registered telephone number;

at least one input/output interface circuitry operable to input from a terminal device through a communication path, a telephone number registration determination request including the telephone number designated by a user through a specified Web page displayed on a terminal device;

at least one processor programmed to:

determine whether or not the telephone number thus included in the registration determination request is registered on the registration list, wherein when the telephone number is not registered on the registration list, send approval request information for encouraging approval to the telephone terminal device, when a call is made to the telephone terminal device corresponding to the telephone number through the display the Web page and the call is answered, and register the telephone number thus included in the registration determination request on the registration list in a state of displaying the Web page, in a case where approval information indicative of the approval is received from the telephone terminal device in response to the approval request information, wherein the telephone terminal device transmits the approval information to the server device when an operation button indicative of approval is pressed by the user on the telephone terminal device, wherein a pair of telephone number and store identification information is registered on the registration list, store identification information of the store corresponding to the Web page is included together with the telephone number in the registration determination request, the at least one processor is programmed to determine whether or not the pair of telephone number and store identification information which is included in the registration determination request is registered on the registration list, when the pair of telephone number and store identification information is not registered on the registration list, the at least one processor is programmed to send approval request information for encouraging approval to the telephone terminal device, when a call is made to the telephone device corresponding to the telephone number through a communication means in a state of displaying the Web page and the call is answered, and the at least one processor is programmed to register on the registration list the pair of telephone number and store identification information which is included in the registration determination request in a state of displaying the Web page, in a case where approval information indicative of approval is received from the telephone terminal device in response to the approval request information.

7. The server system according to claim 6, wherein the registration list comprises at least one telephone number of the other telephone terminal device.

8. The server system according to claim 6, wherein the telephone number of the other telephone terminal device may be designated by the user.

9. The server system according to claim 7, wherein the telephone terminal device transmits the approval information to the server device when an operation button indicative of approval is pressed by the user on the telephone terminal device.

* * * * *